United States Patent
Winker

(10) Patent No.: US 6,935,825 B2
(45) Date of Patent: Aug. 30, 2005

(54) WHEEL NUT AND FASTENING ELEMENT

(75) Inventor: Alexander Winker, Spaichingen (DE)

(73) Assignee: Metallwarenfabrik Hermann Winker GmbH & Co, KG, Spaichingen (DE)

( * ) Notice: Subject to any disclaimer, the term of this patent is extended or adjusted under 35 U.S.C. 154(b) by 0 days.

(21) Appl. No.: 10/727,114

(22) Filed: Dec. 3, 2003

(65) Prior Publication Data

US 2004/0165967 A1 Aug. 26, 2004

(30) Foreign Application Priority Data

Dec. 3, 2002 (DE) .......................................... 102 56 653

(51) Int. Cl.⁷ .............................................. F16B 37/14
(52) U.S. Cl. .................................... 411/429; 411/533
(58) Field of Search .............................. 411/429, 430, 411/533, 375

(56) References Cited

U.S. PATENT DOCUMENTS

| | | | | |
|---|---|---|---|---|
| 3,585,900 A | * | 6/1971 | Chaivre | 411/430 |
| 4,295,766 A | * | 10/1981 | Shaw | 411/113 |
| 4,717,299 A | * | 1/1988 | Underwood | 411/11 |
| 4,969,788 A | * | 11/1990 | Goiny | 411/428 |
| 4,993,902 A | * | 2/1991 | Hellon | 411/430 |
| 5,730,568 A | * | 3/1998 | Lanham et al. | 411/432 |
| 6,036,420 A | * | 3/2000 | Somers et al. | 411/430 |
| 6,074,148 A | * | 6/2000 | Wilson | 411/430 |
| 6,102,488 A | * | 8/2000 | Wilson | 301/35.623 |
| 6,435,791 B1 | * | 8/2002 | Bydalek | 411/428 |
| 6,592,314 B1 | * | 7/2003 | Wilson | 411/429 |

* cited by examiner

*Primary Examiner*—Flemming Saether
(74) *Attorney, Agent, or Firm*—Kriegsman & Kriegsman

(57) ABSTRACT

The present invention relates to a wheel nut (10) having a nut body (11) with a widened radial collar (12) and a thrust washer (13) which is held rotatably and captively on the nut body (11) by a locking means (16), and having a cap (14) arranged on the nut body (11). In this case, the locking means (16) is designed as an edge (17) which runs around on the thrust washer (13) and which engages both over the collar (12) and over a flange (18) formed at the free end of the cap (14). The present invention relates, moreover, to a further fastening element of this type, for example a wheel screw.

11 Claims, 2 Drawing Sheets

WHEEL NUT AND FASTENING ELEMENT

BACKGROUND OF THE INVENTION

The invention relates to a wheel nut having a nut body with a widened radial collar and with a thrust washer which is held rotatably and captively on the nut body by a locking means, and having a cap arranged on the nut body. The invention relates, furthermore, to a fastening element of this type.

Wheel nuts or fastening elements of this type, such as, for example, wheel screws with a decorative cap, are known in the field of motor vehicle technology. They serve, in particular, for the fastening of wheel rims, and above all of high-quality aluminum rims, but also steel rims, on a wheel hub. The caps are produced from highly polished stainless steel and are placed onto the engagement part of a nut or of a fastening element, said engagement part being in most cases of hexagonal design.

It is customary to connect such a cap firmly to the fastening element or to the nut body of a wheel nut by means of electrical ring welding. It is also customary for the cap to be fastened on the nut body by adhesive bonding.

When the cap is being welded to the fastening element or to the nut body of the wheel nut, on the one hand, a complicated welding appliance is required. On the other hand, damage to the visible surface of the cap may occur. The highly polished surface of the cap can be dulled by an electrode being applied. The bearing surface of the nut body or of the fastening element, said bearing surface being in engagement with the surface of a thrust washer, may also be damaged. This damage arises due to the fact that the electrodes necessary for the welding operation are applied at these points. Furthermore, satisfactory welding between the cap and the nut body or fastening element is possible only when the surfaces of the individual components are electrically conductive. This means that, for welding purposes, the surface of the components must, for example, be galvanized.

Since then, however, other surface coatings, such as the application of a lacquer layer in the form of a zinc lamellar coating, have also been employed, but these are, in part, not electrically conductive and therefore rule out a welded connection.

SUMMARY OF THE INVENTION

The German laid-open publication DE 101 23 854 A1 discloses a wheel fastening arrangement, in which a thrust ring is held rotatably and captively on the flange of a nut body by means of a beaded edge, with a thrust washer being interposed. However, a decorative cap is merely slipped onto the hexagonal portion of the nut body, without being fastened in a particular way. Such a static-frictional connection between the cap and the nut body may easily lead to the loss of the cap.

The object on which the invention is based is to provide a wheel nut or a fastening element of the abovementioned type, which has an uncomplicated construction and the individual components of which can be assembled and held together in a simple way.

The solution lies in the wheel nut having the features of patent claim 1 and in a fastening element having the features of claim 2. The wheel nut according to the invention or the fastening element according to the invention is distinguished in that the thrust washer and the cap are held jointly on the nut body by the locking means.

The result of the wheel nut or of the fastening element being designed according to the invention is that the three components, nut body or body, thrust washer and cap, are held in their assembled position reliably and in a functionally appropriate manner as single locking means and in a single operation. Furthermore, there is no longer any need for a complicated and inefficient welding or adhesive bonding of the cap on the nut body or body. Above all, even surface treatments of the individual components can be carried out which are no longer suitable for the welding of the cap and nut body or body because of their electrical conductivity.

Advantageous developments may be gathered from the subclaims.

In particular, the invention is such that the locking means is designed as an edge which runs around on the thrust washer and which engages both over the collar and over a flange formed at the free end of the cap. Purely as a result of a design of this type, the cap is held jointly with the thrust washer on the nut body or body.

The three components, nut body or body, thrust washer and cap, are assembled in a simple way in that a free region at the edge of the thrust washer is provided, which can be oriented radially inward after the assembly of the nut body or body, the thrust washer and the cap. In this case, the free region of the edge can be oriented radially inward by means of a beading method.

Assembly of this type has the advantage that all three components, such as nut body or body, thrust washer and cap, can be set in their mutually assigned position simply by the beading of the free region of the edge of the locking means. In this case, it proves advantageous for the flange of the cap to lie on the collar of the nut body or body.

In a further embodiment, the nut body or body has, above the collar, a step-shaped shoulder running around, the cap being provided, above the flange, with a step adapted to the shape of the shoulder.

This design of the subject of the invention contributes decisively to ensuring that, as a result of the meander-like design, no or virtually no moisture can penetrate between the cap and the nut body or body. The useful life of the wheel nut or of the fastening element is thereby prolonged considerably because of the absence of corrosion.

This advantage of leaktightness with respect to moisture is reinforced considerably in that, with the nut assembled or the fastening element assembled, the free region of the edge of the thrust washer is contiguous, flush and in a leaktight manner, to the step which is formed on the cap.

The measure whereby the cap sits on the nut body or body by means of a press fit also contributes to ensuring that no or little moisture can penetrate between the cap and nut body or body.

In a further embodiment of the invention, at least one of the surfaces of the nut body or body and of the thrust washer which lie on one another is provided with a central recess running around, in such a way that the nut body or body and the thrust washer lie on one another only in their outer radial region.

This design has, on the one hand, the advantage that, in the case of any angular tolerances between the bearing surfaces of the nut body or body and of the thrust washer, not only linear bearing contact takes place between these components, but essentially also two-dimensional bearing contact. Moreover, this embodiment results in a more uniform prestressing force of the connection between nut and screw or between fastening element and screw. On the other hand, the recess may be utilized for receiving a suitable lubricant.

In a development of the invention, a sealing means may be provided between the locking means and the collar and the cap. Expediently, the sealing means may be provided between the free region of the edge of the thrust washer and the collar or the flange of the cap. This design has the advantage that the penetration of moisture is prevented or at least reduced even between the nut body or body and the thrust washer.

In particular, the development may be such that the sealing means is a sealing ring or a sealing washer which is arranged between the flange of the cap, said flange lying on the collar of the nut body or body, and the radially inward-oriented free region of the edge of the thrust washer.

An embodiment of this type can be produced in a simple way, reliably in terms of the process and cost-effectively and has a positive effect on the useful life and functional reliability of the connection between screw and nut or screw and fastening means.

BRIEF DESCRIPTION OF THE DRAWINGS

Exemplary embodiments of the present invention are explained in more detail below with reference to the accompanying drawings in which.

DETAILED DESCRIPTION OF PREFERRED EMBODIMENTS

Figure 1:
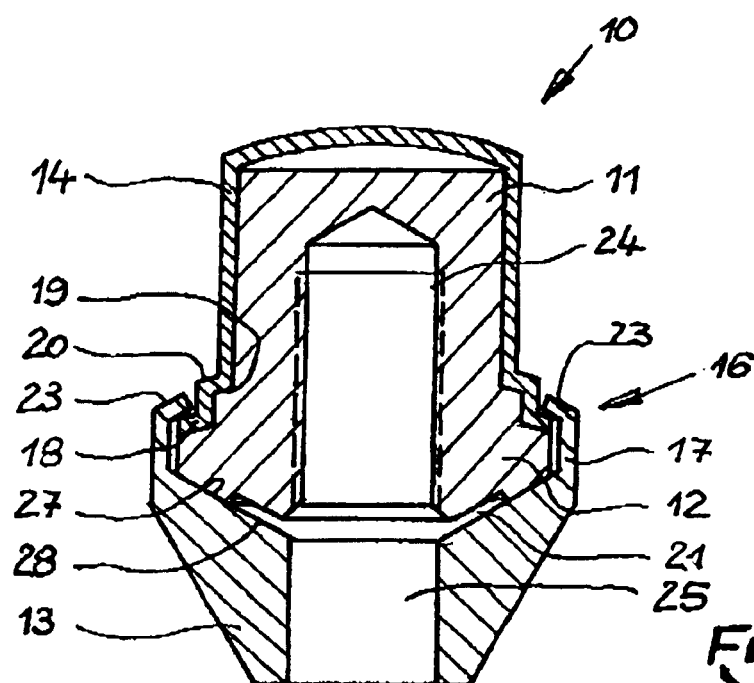
FIG. 1 shows an exemplary embodiment of the fastening element according to the invention in the form of a wheel nut, in a diagrammatic sectional illustration which is not true to scale.

As illustrated in FIG. 1, a wheel nut 10 of the invention, which serves for fastening a wheel rim on a wheel hub, consists of a nut body 11 having a radially widened collar 12 running around. The nut body 11 is provided with an axial threaded bore 24 for receiving a threaded bolt.

For reasons of decorative appearance, the nut body 11 is encased by a cap 14 which consists of polished stainless steel. In this case, the free open end of the cap 14 terminates in a flange 18 which lies on the radially widened collar 12 of the nut body 11. Above the collar 12, the nut body 11 is provided with a shoulder 19 running around, and the cap 14 has a step 20 adapted to the shape of the shoulder 19. This meander-like design largely prevents the penetration of moisture between the nut body 11 and the cap 14. In order to optimize this effect, the cap 14 sits on the nut body 11 by means of a press fit.

A thrust washer 13 bears rotatably with its surface 28 on a surface 27 of the nut body 11. The thrust washer 13 is provided with a passage bore 25 and with a locking means 16 which, in the exemplary embodiment, consists of an axially extending edge 17 terminating in the free region 23.

This edge 17 with its free region 23 surrounds the collar 12 of the nut body 11 and, at the same time, the flange 18 of the cap 14, said flange lying on the collar 12. In this way, the thrust washer 13 is held captively and rotatably on the nut body 11 and also the cap 14 is held on the nut body 11.

By virtue of this inventive design, the three components, nut body 11, thrust washer 13 and cap 14, can be connected to one another in a single operation by the free region 23 of the edge 17 being beaded radially inward.

Of course, in addition to the wheel nut 10 being designed according to the invention, the cap 14 can be secured to the nut body 11 by means of an adhesive bond or a weld. According to the invention, however, this is not necessary in terms of the reliable functioning of the wheel nut.

Finally, a central radially extending recess 21 is provided in that surface 27 of the nut body 11 which lies on the surface 28 of the thrust washer 13. The recess is also possible in the thrust washer. This recess 21 prevents the situation where, in the event of angular tolerances between the surfaces 27 and 28, only linear bearing contact occurs between the surfaces. Shifting of the bearing contact of the surfaces 27 and 28 radially outward reduces the dispersion of the prestressing force between the wheel nut 10 and a screwed-in screw bolt. The recess 21 may be utilized additionally for receiving a lubricant.

Figure 2:
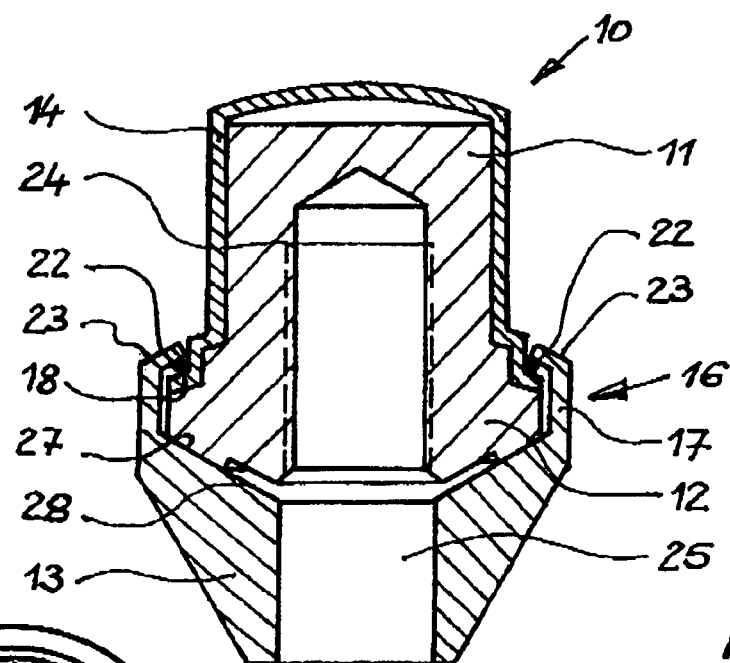
FIG. 2 shows a further exemplary embodiment according to FIG. 1, in a diagrammatic sectional illustration which is not true to scale.

FIG. 2 shows a development of the wheel nut 10. Here, the same reference numerals designate components identical to those in the exemplary embodiment described with reference to FIG. 1.

The difference from the exemplary embodiment illustrated in FIG. 1 is the arrangement of a sealing ring 22 between the flange 18 of the cap 14 and the free region 23 of the edge 17 of the locking means 16.

This embodiment largely prevents a penetration of moisture between the nut body 11 and the thrust washer 13, so that the formation of corrosion on these components is virtually ruled out.

The wheel nut according to the invention thus constitutes a component which can be produced simply and cost-effectively and has high process reliability and which ensures a reliable and long-term functioning.

Figure 4:
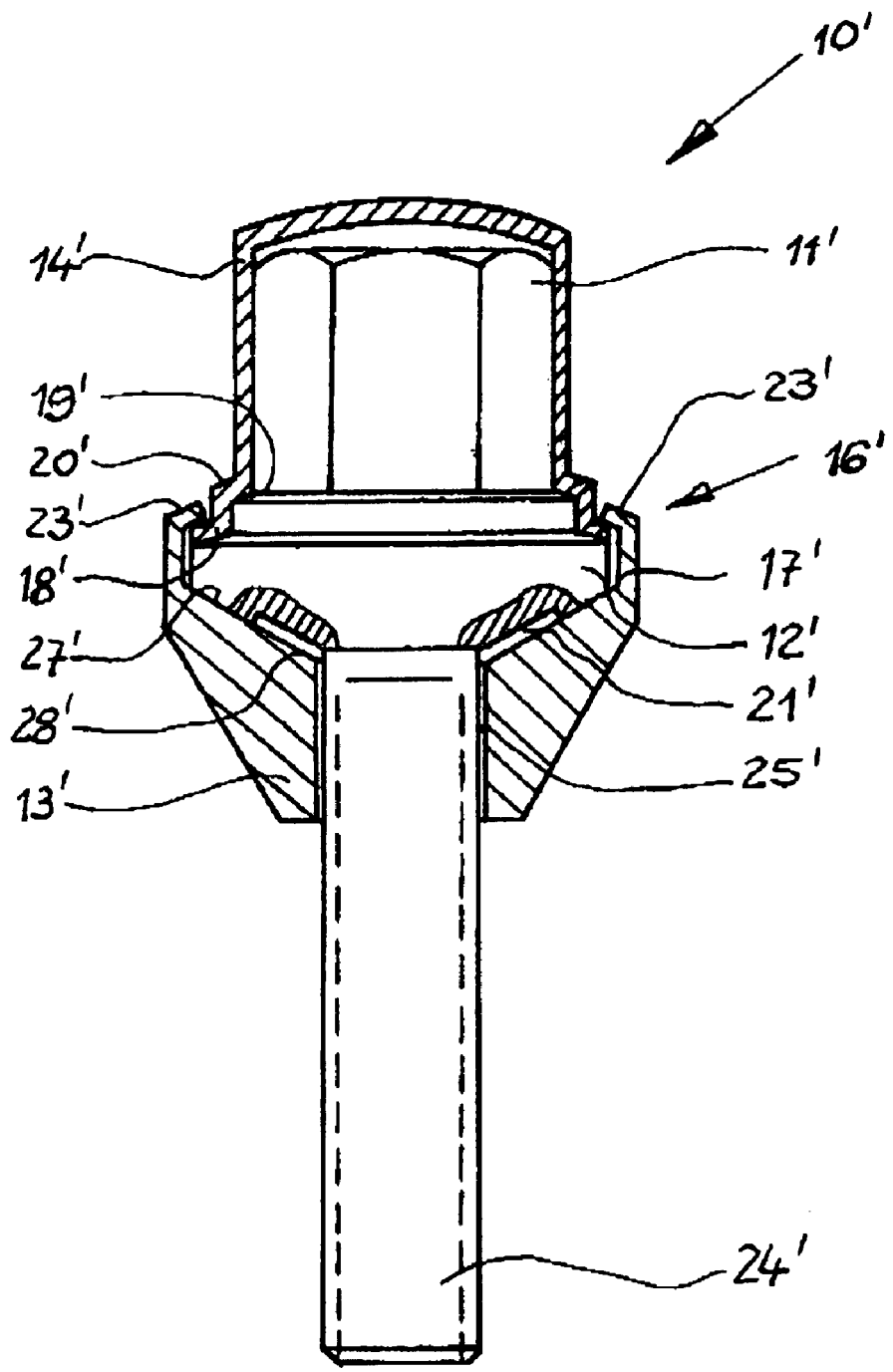
FIG. 4 shows a further exemplary embodiment of the fastening element according to the invention in the form of a wheel screw, in a diagrammatic sectional illustration which is not true to scale.

FIG. 4 shows a further exemplary embodiment of a fastening element according to the invention in the form of a wheel screw 10'. The wheel screw 10' serves for fastening a wheel rim on a wheel hub and has a screw body 11' with a radially widened collar 12' running around. The screw body 11' is provided, in the axial extension of the collar 12' with a threaded bolt 24'.

For reasons of decorative appearance, the screw body 11' is encased by a cap 14' which consists of polished stainless steel. In this case, the free open end of the cap 14' terminates in a flange 18' which lies on the radially widened collar 12' of the screw body 11'. Above the collar 12', the screw body 11' is provided with a shoulder 19' running around, and the cap 14' has a step 20' adapted to the shape of the shoulder 19'. This meander-like design largely prevents the penetration of moisture between the screw body 11' and the cap 14'. In order to optimize this effect, the cap 14' sits on the screw body 11' by means of a press fit.

A thrust washer 13' bears rotatably with its surface 28' on the surface 27' of the screw body 11'. The thrust washer 13' is provided with a passage bore 25' and with a locking means 16' which, in the exemplary embodiment, consists of an axially extending edge 17' which terminates in the free region 23'.

This edge 17' with its free region 23' surrounds the collar 12' of the screw body 11' and, at the same time, the flange 18' of the cap 14', said flange lying on the collar 12'. In this way, the thrust washer 13' is held captively and rotatably on the screw body 11' and the cap 14' is also held on the screw body 11'.

By virtue of this inventive design, the three components, screw body 11', thrust washer 13' and cap 14', can be connected to one another in a single operation by the free region 23' of the edge 17' being beaded radially inward.

Of course, in addition to the wheel screw 10' being designed according to the invention, the cap 14' can be secured to the screw body 11' by means of an adhesive bond or a weld. According to the invention, however, this is not necessary in terms of reliable functioning of the wheel screw.

Finally, a central radially extending recess 21' is provided in that surface 27' of the nut body 11' which lies on the surface 28' of the thrust washer 13'. It is also possible for the recess to be arranged in the thrust washer. This recess 21' prevents the situation where, in the event of angular tolerances between the surfaces 27' and 28', only linear bearing contact occurs between the surfaces. Shifting the bearing contact of the surfaces 27' and 28' radially outward reduces the dispersion of the prestressing force between the wheel screw 10' and a screwed-on nut. The recess 21' may additionally be utilized for receiving a lubricant.

Figure 3:
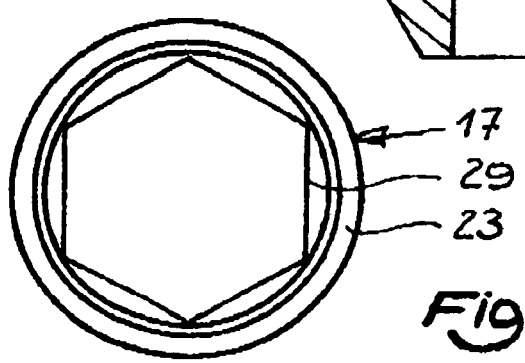
FIG. 3 shows a top view of the wheel nut according to FIG. 1 in a diagrammatic illustration which is not true to scale.

As with the wheel nut 10 illustrated in FIGS. 1 to 3, in the wheel screw 10' illustrated in FIG. 4 a sealing ring may be arranged between the flange 18' of the cap 14' and the free region 23' of the edge 17' of the locking means 16'.

This embodiment largely prevents a penetration of moisture between the screw body 11' and the thrust washer 13', so that the formation of corrosion on these components is virtually ruled out.

The wheel screw according to the invention thus constitutes a component which can be produced simply and cost-effectively and has high process reliability and which ensures reliable and long-term functioning.

What is claimed is:

1. A wheel nut comprising a nut body with a widened radial collar, a thrust washer which is held rotatably and captively on the nut body by a locking means, and a cap arranged on the nut body, wherein the locking means is formed as an annular edge on the thrust washer, said annular edge overlapping the widened radial collar and a flange formed at a free end of the cap in such a way that the cap and the thrust washer are held jointly on the nut body.

2. The wheel nut as claimed in claim 1, wherein a free region is provided at the annular edge wherein said free region is oriented radially inward after the assembly of the body, the thrust washer and the cap.

3. The wheel nut as claimed in claim 2, wherein the free region of the annular edge is oriented radially inward by means of a beading method.

4. The wheel nut as claimed in claim 1, wherein the flange of the cap is located on the widened radial collar of the nut body.

5. The wheel nut as claimed in claim 1, wherein; the body has a step-shaped shoulder positioned adjacent to the widened radial collar and wherein the cap is provided, adjacent to the flange, with a step adapted to the shape of the step-shaped shoulder.

6. The wheel nut as claimed in claim 1, wherein a free region of the annular edge is contiguous to, flush with and in a leakproof manner with the cap.

7. The wheel nut as claimed in claim 1, wherein the cap sits on the nut body by means of a press fit.

8. The wheel nut as claimed in claim 1, wherein at least one surface of the nut body and of the thrust washer which face each other is provided with a central recess in such a way that the nut body and the thrust washer are in contact only in their outer radial region.

9. The wheel nut as claimed in claim 1, wherein a sealing means is provided between the locking means and the widened radial collar and the cap.

10. The wheel nut as claimed in claim 9, wherein the sealing means is provided between the widened radial collar and the flange of the cap.

11. The wheel nut as claimed in claim 8, wherein the sealing means is a sealing ring or a sealing washer which is arranged between the flange of the cap, said flange lying on the widened radial collar of the nut body, and a radially inward-oriented free region of the annular edge of the thrust washer.

* * * * *